United States Patent
Kubo et al.

(10) Patent No.: US 11,113,521 B2
(45) Date of Patent: Sep. 7, 2021

(54) INFORMATION PROCESSING APPARATUS

(71) Applicant: FUJIFILM Business Innovation Corp., Tokyo (JP)

(72) Inventors: Shusaku Kubo, Kanagawa (JP); Shigeru Okada, Kanagawa (JP); Masanori Yoshizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 57 days.

(21) Appl. No.: 16/543,633

(22) Filed: Aug. 19, 2019

(65) Prior Publication Data

US 2020/0250418 A1 Aug. 6, 2020

(30) Foreign Application Priority Data

Feb. 4, 2019 (JP) .............................. JP2019-018240

(51) Int. Cl.
*G06K 9/00* (2006.01)
*G06K 9/34* (2006.01)
(Continued)

(52) U.S. Cl.
CPC ......... *G06K 9/00469* (2013.01); *G06K 9/342* (2013.01); *G06K 9/344* (2013.01); *G06K 9/726* (2013.01); *H04N 1/00331* (2013.01)

(58) Field of Classification Search
CPC .... G06K 9/00469; G06K 9/344; G06K 9/342; G06K 9/726; G06K 9/4642; H04N 1/00331

(Continued)

(56) References Cited

U.S. PATENT DOCUMENTS

2004/0240738 A1 12/2004 Nakajima
2009/0086249 A1* 4/2009 Sakurai ................ H04N 1/2376
358/1.13

(Continued)

FOREIGN PATENT DOCUMENTS

| EP | 415373 | * 8/1990 | ............... G06K 9/20 |
| JP | 2004272822 | 9/2004 | |
| JP | 2015216551 | 12/2015 | |

Primary Examiner — Jerome Grant, II
(74) Attorney, Agent, or Firm — JCIPRNET

(57) ABSTRACT

An information processing apparatus includes a receiving unit that receives a series of image information items formed of successive image information items of recording media on each of which an image has been formed, a setting unit that sets, as a judgement area, image information of at least a portion of a region having a predetermined width and whose center is set to a boundary between the recording media, which are included in the series of image information items, a determining unit that performs predetermined image processing on the judgement area and determines whether the image information items of the recording media are independent of each other in terms of content or are continuous with each other in terms of content, and an output unit that outputs the series of image information items by splitting the series of image information items when the determining unit determines that the image information items of the recording media are independent of each other and that outputs the series of image information items together when the determining unit determines that the image information items of the recording media are continuous with each other.

17 Claims, 6 Drawing Sheets

(51) Int. Cl.
*H04N 1/00* (2006.01)
*G06K 9/72* (2006.01)

(58) Field of Classification Search
USPC .......................................................... 382/176
See application file for complete search history.

(56) References Cited

U.S. PATENT DOCUMENTS

| | | | | |
|---|---|---|---|---|
| 2012/0297218 | A1* | 11/2012 | Hsiu | G06F 1/3265 |
| | | | | 713/320 |
| 2016/0048723 | A1* | 2/2016 | Jeong | G06K 9/4642 |
| | | | | 382/197 |
| 2016/0048728 | A1* | 2/2016 | Chulinin | G06K 9/00456 |
| | | | | 382/185 |
| 2020/0167588 | A1* | 5/2020 | Ohara | G06K 9/3233 |

\* cited by examiner

FIG. 2
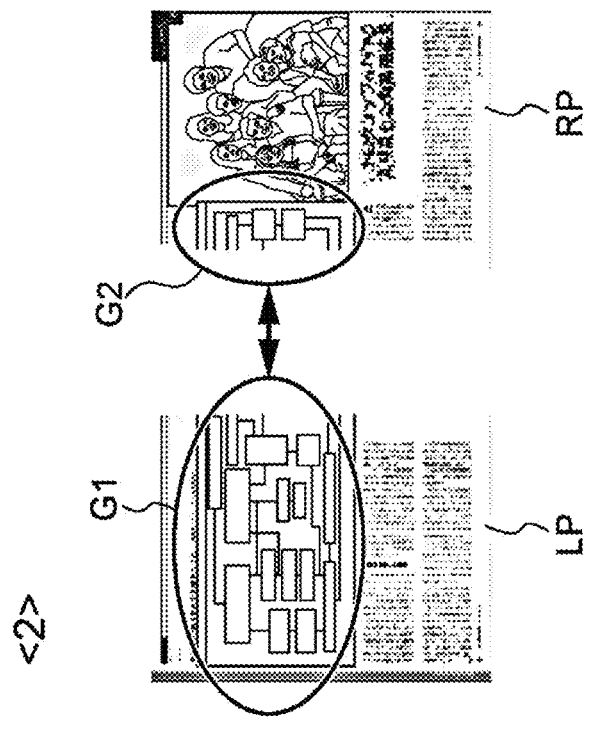
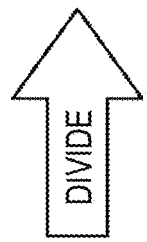
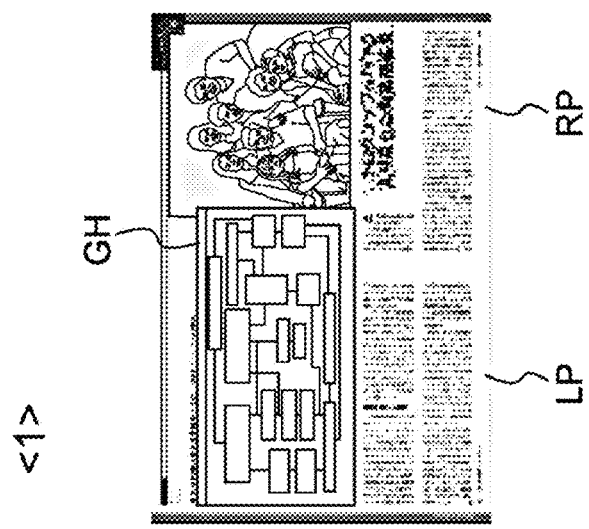

INFORMATION PROCESSING APPARATUS

CROSS-REFERENCE TO RELATED APPLICATIONS

This application is based on and claims priority under 35 USC 119 from Japanese Patent Application No. 2019-018240 filed Feb. 4, 2019.

BACKGROUND

(i) Technical Field

The present disclosure relates to an information processing apparatus.

(ii) Related Art

Japanese Unexamined Patent Application Publication No. 2015-216551 discloses an image forming apparatus that includes a detection-processing-area deciding unit that decides which areas in image data obtained by unbinding a book and reading images of the unbound book are to be subjected to spread determination processing, a spread-page detection processing unit that detects pages forming a spread, and a post-detection processing unit that performs processing after spread-page detection processing has been performed in order to enable two facing pages forming a spread to be collectively viewed when the two facing pages are viewed as pages of an electronic book.

Japanese Unexamined Patent Application Publication No. 2004-272822 discloses a character recognition apparatus that specifies a plurality of recognition areas in image data of a document having a single page and performs character recognition on each of the recognition areas, the character recognition apparatus including a processing-target-area selecting unit that selects one of the plurality of recognition areas as a processing target area and a continuation determining unit that determines whether the processing target area is continuous with any one of the plurality of recognition areas that are located in the vicinity of the processing target area. The continuation determining unit includes a first character recognition unit that performs character recognition on image data in the processing target area, a second character recognition unit that determines the plurality of recognition areas, which are located in the vicinity of the processing target area, to be potential recognition areas and that performs character recognition on image data in each of the plurality of recognition areas, and a text determination unit that determines whether a text in the processing target area is continuous with a text in any one of the potential recognition areas on the basis of the characters obtained by the first character recognition unit and the characters in the potential recognition areas obtained by the second character recognition unit.

SUMMARY

Aspects of non-limiting embodiments of the present disclosure relate to providing an information processing apparatus capable of more quickly determining whether a series of images that is formed of successive recording media each having an image formed thereon is splittable into the individual recording media in terms of content or should not be split into the individual recording media in terms of content compared with the case where this determination is performed by using the entire series of images.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a receiving unit that receives a series of image information items formed of successive image information items of a plurality of recording media on each of which an image has been formed, a setting unit that sets, as a judgement area, image information of at least a portion of a region having a predetermined width and whose center is set to a boundary between the recording media, which are included in the series of image information items, a determining unit that performs predetermined image processing on the judgement area and determines whether the image information items of the plurality of recording media are independent of each other in terms of content or are continuous with each other in terms of content, and an output unit that outputs the series of image information items by splitting the series of image information items when the determining unit determines that the image information items of the plurality of recording media are independent of each other and that outputs the series of image information items together when the determining unit determines that the image information items of the plurality of recording media are continuous with each other.

BRIEF DESCRIPTION OF THE DRAWINGS

An exemplary embodiment of the present disclosure will be described in detail based on the following figures, wherein:

FIG. 2 is a diagram illustrating a continuous spread;

DETAILED DESCRIPTION

An exemplary embodiment of the present disclosure will be described in detail below with reference to FIG. 1 to FIG. 6. In the following description, a case where an information processing apparatus according to the present disclosure is applied to an image forming apparatus will be described as an example.

Figure 1:
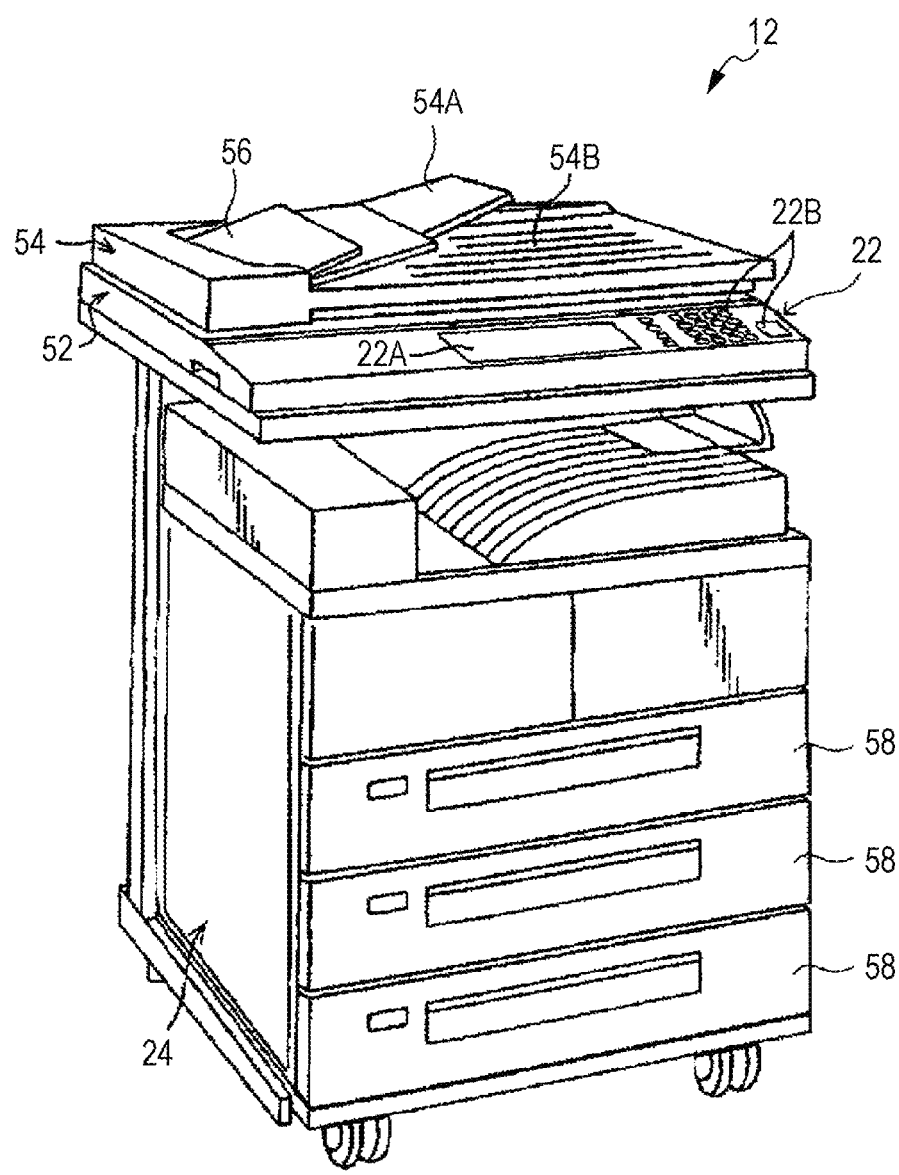
FIG. 1 is a perspective view illustrating an example of the configuration of an image forming apparatus according to the exemplary embodiment.

An image forming apparatus according to the present exemplary embodiment will be described with reference to FIG. 1. FIG. 1 is a perspective view of an image forming apparatus 12 according to the present exemplary embodiment. For example, the image forming apparatus 12 according to the present exemplary embodiment has a print function of receiving various data via a communication line (not illustrated) and performing an image forming processing based on the received data. In addition, the image forming apparatus 12 according to the present exemplary embodiment has a reading function of reading a document and obtaining image information that indicates the document, a copying function of copying an image recorded on a document to a sheet, a facsimile function of transmitting and receiving various data via a telephone line (not illustrated), and so forth.

The image forming apparatus 12 according to the present exemplary embodiment further includes a document reading unit 52 provided in an upper portion of the image forming apparatus 12 and an image forming unit 24 disposed below the document reading unit 52. The document reading unit 52 includes a document cover 54 and a document transport unit (not illustrated) that is provided in the document cover 54. The document transport unit sequentially takes in documents 56 placed on a document feeding unit 54A, which is included in the document cover 54, and transports the documents 56 to a platen glass (not illustrated). Then, the document transport unit reads (hereinafter sometimes referred to as "scan") images recorded on the documents 56. In addition, the document transport unit ejects the documents 56, the images of which have been read, to a document ejection unit 54B that is included in the document cover 54.

The document reading unit 52 further includes a user interface 22 that receives various instruction operations from a user. The user interface 22 includes, for example, a touch-screen display 22A on which a display button and various information are displayed, the display button being enabled by a software program to receive an instruction operation, and hardware keys 22B, such as a numeric keypad and a start button. In the user interface 22, the display button of the display 22A and the hardware keys 22B are used for setting of the number of documents to be copied and setting magnification when the copying function is used and are used as dial keys of a telephone and so forth when the facsimile function is used.

The image forming unit 24 includes a sheet-feeding storing unit 58 that accommodates sheets serving as recording media on which images are to be formed. In the image forming unit 24, the sheets accommodated in the sheet-feeding storing unit 58 are taken out one by one, and an image based on image data is formed on each of the sheets by, for example, an electrophotographic process. In addition, in the image forming unit 24, the sheets on which images have been formed are sequentially ejected to a sheet-ejection unit (not illustrated).

In an image forming apparatus such as the image forming apparatus 12 that includes the document reading unit 52, there is a case where a catalogue, a magazine, or a book (hereinafter sometimes referred to as "book or the like") is copied or scanned while being in an open state (hereinafter sometimes referred to as "spread state"). A scanning operation will be described below as an example. An image forming apparatus may sometimes have a mode, such as a book mode, in which a book or the like is scanned while being in the spread state. For example, when a book or the like is scanned in the book mode, images of left and right pages are formed by splitting an image of a spread at the center thereof. However, a book or the like often contains an article or an image spreading across left and right pages, and such an image may be more difficult to view if the image is split at the center thereof. Note that a "spread" is an example of "a series of image information items".

FIG. 2 is a diagram more specifically illustrating the above case. A spread of a book or the like is illustrated in <1> of FIG. 2. In other words, a left page LP and a right page RP are included in a single image, and an image GH spreads across the left page LP and the right page RP. A state in which the spread has been split into an image of the left page LP and an image of the right page RP is illustrated in <2> of FIG. 2. As illustrated in <2> of FIG. 2, the image GH is split into an image G1 and an image G2, and in this case, it is extremely difficult to view the image GH particularly when the image GH is a series of figures or the like. In order to address such a situation, it may be considered to scan pages such as those illustrated in <1> of FIG. 2 without splitting them.

However, performing such split scanning and non-split scanning in a mixed manner increases the scanning time and is unrealistic. Such a problem is not limited to a figure such as that illustrated in <1> of FIG. 2 and is also common to a semantically continuous text spreading across left and right pages. In other words, a book or the like may sometimes contain both a single article on a double-page spread and a single article on a single page. In this case, when all images, which are scanning results, are split at the center thereof into two pages with no exception, the article that is to be read in a spread is also split and becomes difficult to read. Accordingly, there has been a need for means for more quickly determining whether an image obtained by scanning a book or the like while the book or the like is in the spread state is splittable or should not be split from the standpoint of readability compared with the case where this determination is performed by scanning the entire region of the image as in the related art. Note that, in the following description, a spread, such as that illustrated in <1> of FIG. 2, that contains an image, a text, or the like spreading across the left page LP and the right page RP in terms of content will be referred to as a "continuous spread", and in contrast, a spread that contains images, texts, or the like that are independent of each other in terms of content (that do not affect the readability of their contents even when the spread is split) will be referred to as a "separated spread".

In the present exemplary embodiment, it is determined whether a spread is a separated spread or a continuous spread by using image information of a region that has a predetermined width and whose center is set to the boundary between the two pages of the spread.

A fundamental idea of processing for determining a separated spread and a continuous spread (hereinafter referred to as "spread processing") according to the present exemplary embodiment will now be described with reference to FIG. 3. Steps included in the spread processing according to the present exemplary embodiment may be broadly divided into two processing operations, which are "blank-area detection" and "layout analysis". As a result of performing these processing operations, when a spread contains an image spreading across the left and right pages or when the spread contains a continuous text spreading across the pages, splitting of the spread is not performed. In this case, a basic layout information may be held as a layout database. The layout database includes highly probable combinations in each of which a character area is associated with the position of the character area on a page or the size of the character area. In general, examples of the combinations include the name of a newspaper that is written vertically and positioned at an upper right-hand portion of a page, a headline of the front page of a newspaper that is written horizontally and positioned at an upper portion of a page, and a headline that is written vertically and positioned at a left-hand portion of a page. Since optical character recognition (OCR), which will be described later, is not capable of recognizing large characters, calligraphic characters, and the like, the layout database may sometimes be used to facilitate recognition using OCR as a region in which a character is highly likely to exist.

Figure 3:
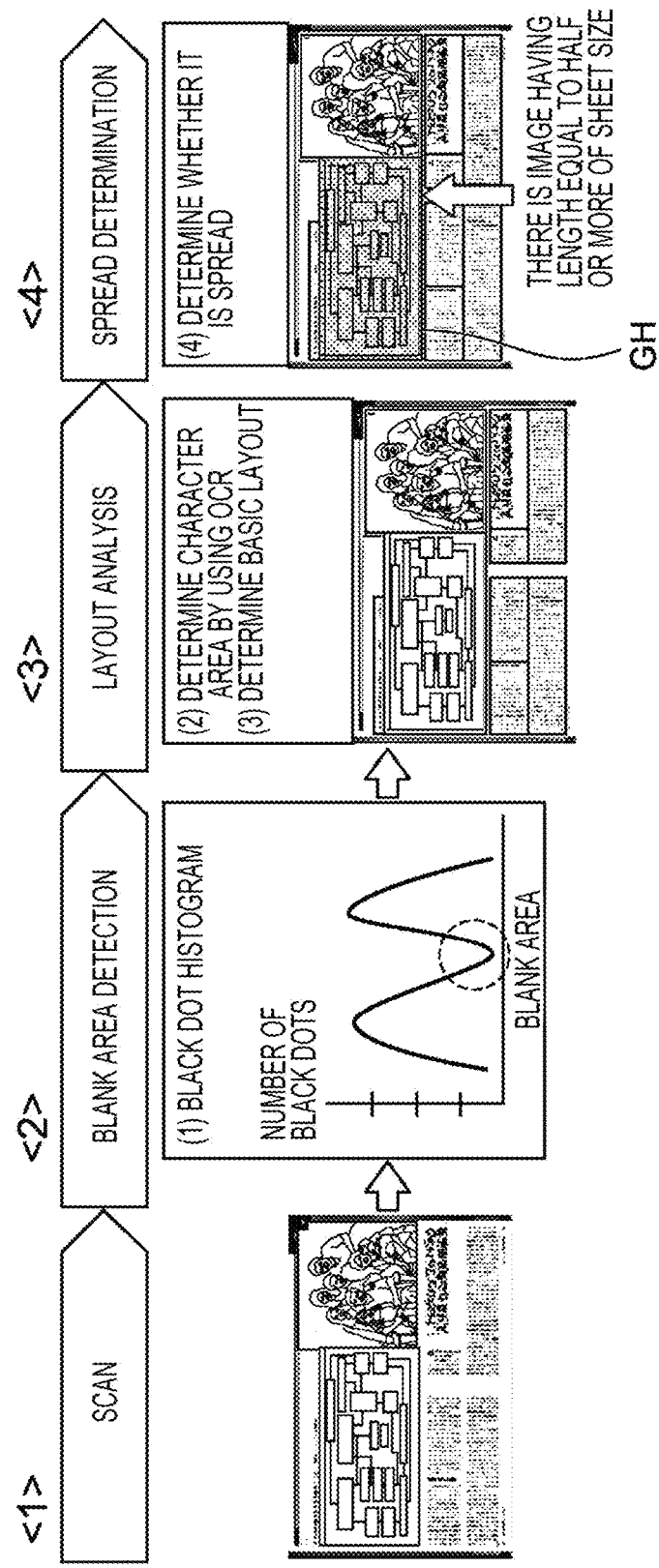
FIG. 3 is a diagram illustrating an overview of spread processing according to the exemplary embodiment.

As illustrated in FIG. 3, in the spread processing according to the present exemplary embodiment, after a book or the like has been scanned (<1> of FIG. 3), blank-area detection processing is performed on obtained image data (<2> of FIG. 3) so as to determine whether there is a blank area. The term "blank area" refers to an area that extends along the boundary between a left page and a right page of a spread in such a manner as to cover the entirety of the boundary and in which a character and an image are not present. When there is no blank area in the spread, the spread is determined to be a continuous spread. In contrast, when there is a blank area in the spread, it is determined that it is difficult at this stage to identify the spread as a separated spread or a continuous spread. Note that, in the present exemplary embodiment, a histogram of black dots is used in the blank-area detection, and details of a histogram of black dots (hereinafter sometimes referred to as "black dot histogram") will be described later.

Next, layout analysis processing is performed (<3> of FIG. 3). The layout analysis processing is performed when it is determined that there is a blank area in the spread as a result of performing the blank-area detection processing and is processing for further determining the content relevance between the left and right pages so as to identify the spread as a separated spread or a continuous spread. More specifically, character regions (hereinafter sometimes referred to as "character areas") are determined by using OCR, and the content (semantic) relevance between the character areas is determined. By performing this processing, the character areas and image regions (hereinafter sometimes referred to as "image areas") are extracted, and the basic layout is determined. It is determined whether the spread is a separated spread or a continuous spread on the basis of the above results (<4> of FIG. 3).

In the case illustrated in <4> of FIG. 3, there is the image GH having a length that is half of the length of a spread or greater in the transverse direction of the spread (i.e., there is no a blank area), and thus, the spread is determined to be a continuous spread. The transverse direction of the spread will hereinafter sometimes be referred to as "transverse direction", and a direction perpendicular to the transverse direction will hereinafter sometimes be referred to as "vertical direction". In the region of the image GH illustrated in <4> of FIG. 3, when there is no image but character areas located at dispersed positions, it is determined whether each combination of one of the character areas in the left page and one of the character areas in the right page has a semantic relevance. When it is determined that one of the combinations has a semantic relevance, the spread is determined to be a continuous spread. Here, a feature of the spread processing according to the present exemplary embodiment is that the blank-area detection processing and the layout analysis processing use, as described above, image information of a region (hereinafter sometimes referred to as "judgement area") that has a predetermined width and whose center is set to the boundary between the two pages of a spread. Note that the "transverse direction" and the "vertical direction" according to the present exemplary embodiment are defined based on a direction in which a spread is to be read as an example. Accordingly, for example, when a spread is to be read in the transverse direction, the "transverse direction" and the "vertical direction" are interchanged.

The blank-area detection processing according to the present exemplary embodiment will now be described in further detail with reference to FIG. 4. Results of scanning images of different patterns of spreads are illustrated in <1> of FIG. 4. Pattern 1 an example of a continuous spread that contains an image present in a judgement area. Pattern 2 is an example of a continuous spread that contains a semantically continuous character string (hereinafter sometimes referred to as "concatenated character string") present in a judgement area. Pattern 3 is an example of a separated spread that is splittable.

Figure 4:
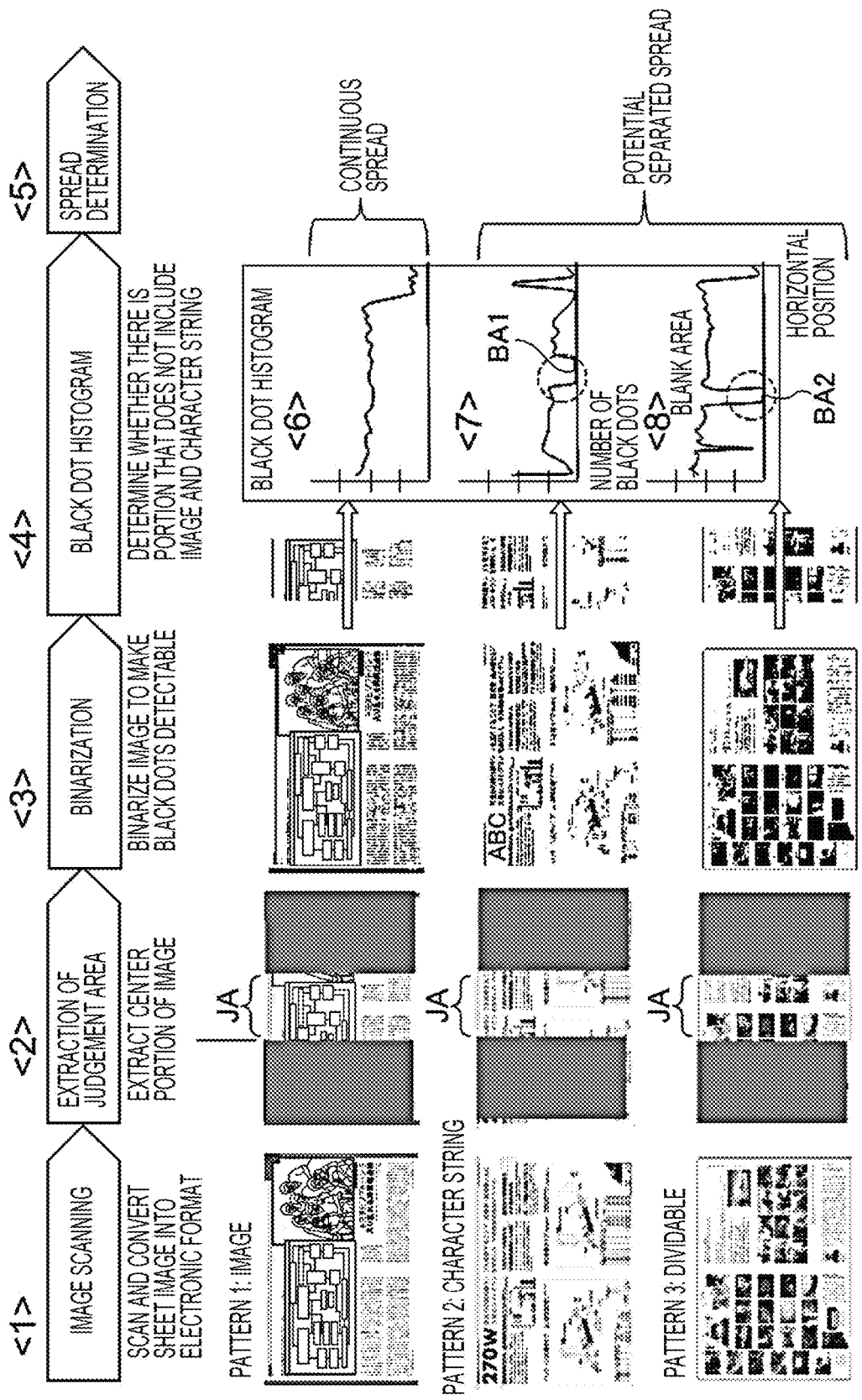
FIG. 4 is a diagram illustrating blank-area detection processing according to the exemplary embodiment.

After each of the spreads has been scanned, a judgement area JA is extracted (is set) (<2> of FIG. 4). For example, in each of the spreads, the judgement area JA is an area having a width that corresponds to one-third to one-half of the width of the spread in the transverse direction while the center of the area is set to the boundary between the left and right pages of the spread. In the present exemplary embodiment, as an example, the judgement area JA is an area having a width that corresponds to one-third of the width of the spread while the center of the area is set to the boundary between the two pages of the spread.

Next, each of the images is binarized in order to facilitate extraction of black dots (<3> of FIG. 4). The term "black dots" refers to dots that correspond to black pixels when the image is binarized to black and white. The image binarization may be performed on the entire image of each of the spreads or may be performed on only the judgement area JA in each of the spreads. As an example, FIG. 4 illustrates the case where the image binarization is performed on the entire image of each of the spreads. Note that OCR processing may be replaced with text image (TI) separation processing.

Next, a black dot histogram is generated (<4> of FIG. 4). In the black dot histogram, the number of black dots with respect to each position in the judgement area JA in the transverse direction is represented in a graph manner. For example, a plurality of black dot histograms are generated at intervals of about 2 mm to about 5 mm in the vertical direction. In other words, a "histogram of black dots" is a histogram of image density. Black dot histograms are used to determine whether there is a blank area BA. Examples of black dot histograms in the vicinity of the centers of the different patterns in the vertical direction are illustrated in <6> to <8> of FIG. 4. As illustrated in <6> of FIG. 4, there is no blank area BA in Pattern 1. As illustrated in <7> and <8> of FIG. 4, a blank area BA1 and a blank area BA2 are respectively present in Pattern 2 and Pattern 3. Consequently, Pattern 1 is determined to be a continuous spread (<5> of FIG. 4). In contrast, Pattern 2 and Pattern 3 may each be a separated spread. However, in the present exemplary embodiment, Pattern 2 and Pattern 3 are each determined to be a spread that requires further analysis (hereinafter sometimes referred to as "potential separated spread") (<5> of FIG. 4). Note that, as will be described later, in the case where it is determined whether a spread is a continuous spread or a separated spread by only performing a binarizing processing, the spread may be determined to be a separated spread at this point.

Note that the case where black dot histograms are generated at intervals of about 2 mm to about 5 mm is an example. The interval value may be a different value as long as a blank area is detectable with the value, and black dot histograms do not need to be generated at uniform intervals. In addition, the binarization is not limited to conversion of an image to black and white, and the binarization may be conversion of an image to a combination of other colors. In addition, histograms may be generated without binarizing a color image.

The layout analysis processing according to the present exemplary embodiment will now be described in further detail with reference to FIG. 5. In the layout analysis, as illustrated in <1> of FIG. 5, the OCR processing is performed on the judgement area JA so as to make a sharp distinction between an image area GA and a character area CA, and layout information of the character area CA and layout information of the image area GA are obtained. The character area CA and the image area GA may be separated from each other by, for example, recognizing an image that is present between the character area CA and the image area GA or the difference in font (particularly character size) between the character area CA and the image area GA.

Figure 5:
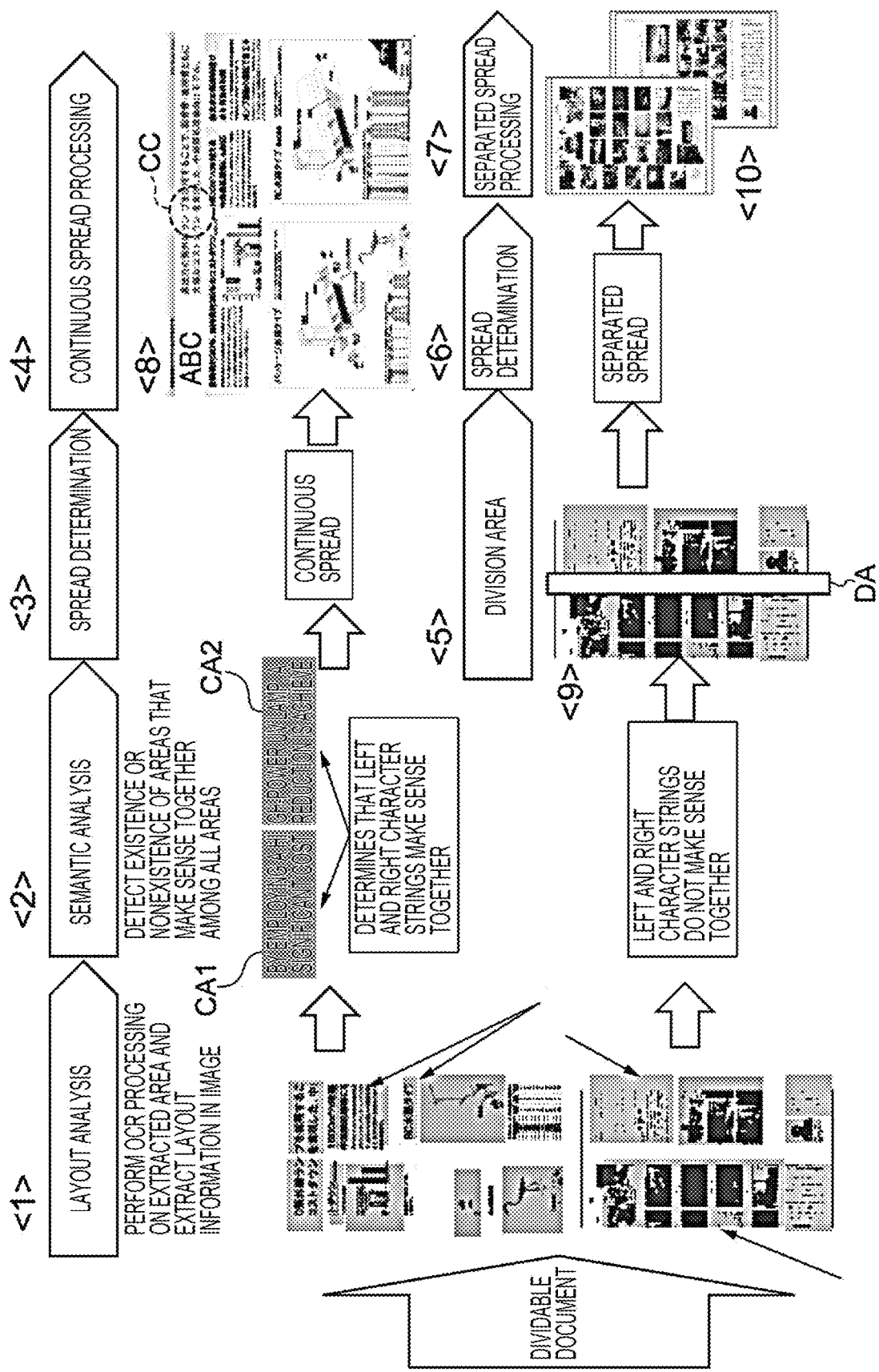
FIG. 5 is a diagram illustrating layout analysis processing according to the exemplary embodiment.

Next, as illustrated in <2> of FIG. 5, semantic analysis is performed on all the combinations of character areas CA. In other words, the semantic analysis is performed so as to determine whether character strings in two of the character areas CA form a correct sentence structure and whether the character strings in these character areas CA form a semantically continuous text together. The semantic analysis may be performed such that, for example, when a word is extracted by connecting characters that are present in different areas, it is determined whether the extracted word exists. More specifically, numbers (hereinafter sometimes referred to as "area numbers") are assigned to the character areas CA in the left page LP and the character areas CA in the right page RP. As the area numbers, serial numbers may be assigned to the character areas CA in the left and right pages LP and RP on a page-by-page basis. Then, analysis is performed on each combination of one of the character areas CA in the left page LP and one of the character areas CA in the right page RP so as to determine whether the character areas CA of any of the combinations has a semantic connection. A case where a character area CA1 and a character area CA2 are semantically connected to each other is illustrated in <2> of FIG. 5.

In this case, the semantic analysis may be performed on the character areas CA directly facing each other with the boundary between the left and right pages interposed therebetween. In other words, when it is unlikely that one of the character areas CA in one of the left and right pages has a semantic connection with one of the character area CA in the other page because there is an image area GA or a different character area CA between the character area CA and the boundary, this character area CA may be excluded from being subjected to the semantic analysis. Note that, in the semantic analysis, texts obtained as a result of performing the OCR processing may be connected to each other for each combination of the character areas CA with a stronger semantic connection by using the above-mentioned layout database. In addition, it may be determined whether two image areas GA are gradationally connected to each other. When the two image areas GA are gradationally connected to each other, these two image areas GA may be determined to be connected to each other as a single image area GA, and a spread contains this image area GA may be determined to be a continuous spread. Note that each combination of one of the character areas CA in the left page LP and one of the character areas CA in the right page RP is an example of an "analysis area" according to the present disclosure.

Next, as illustrated in <3> of FIG. 5, spread determination is performed by using results of the semantic analysis. As a result of performing the semantic analysis, when the left and right pages each contains a character string, and these character strings are semantically connected to each other, that is, when there is a concatenated character string CC illustrated in <8> of FIG. 5 in a spread, the spread is determined to be a continuous spread, and continuous spread processing is performed (<4> of FIG. 5). More specifically, an image in which the left and right pages of the spread are integrated with each other (are not separated from each other) is generated. In contrast, as a result of performing the semantic analysis, when no semantic connection is detected between the character area CA in the left page and the character area CA in the right page (<5> of FIG. 5), the detected blank area BA is determined to be a division area DA that is not semantically connected to any other area (<6> and <9> of FIG. 5), and separated spread processing is performed (<7> of FIG. 5). More specifically, images are generated by splitting an image of the spread into the left and right pages.

Figure 6:
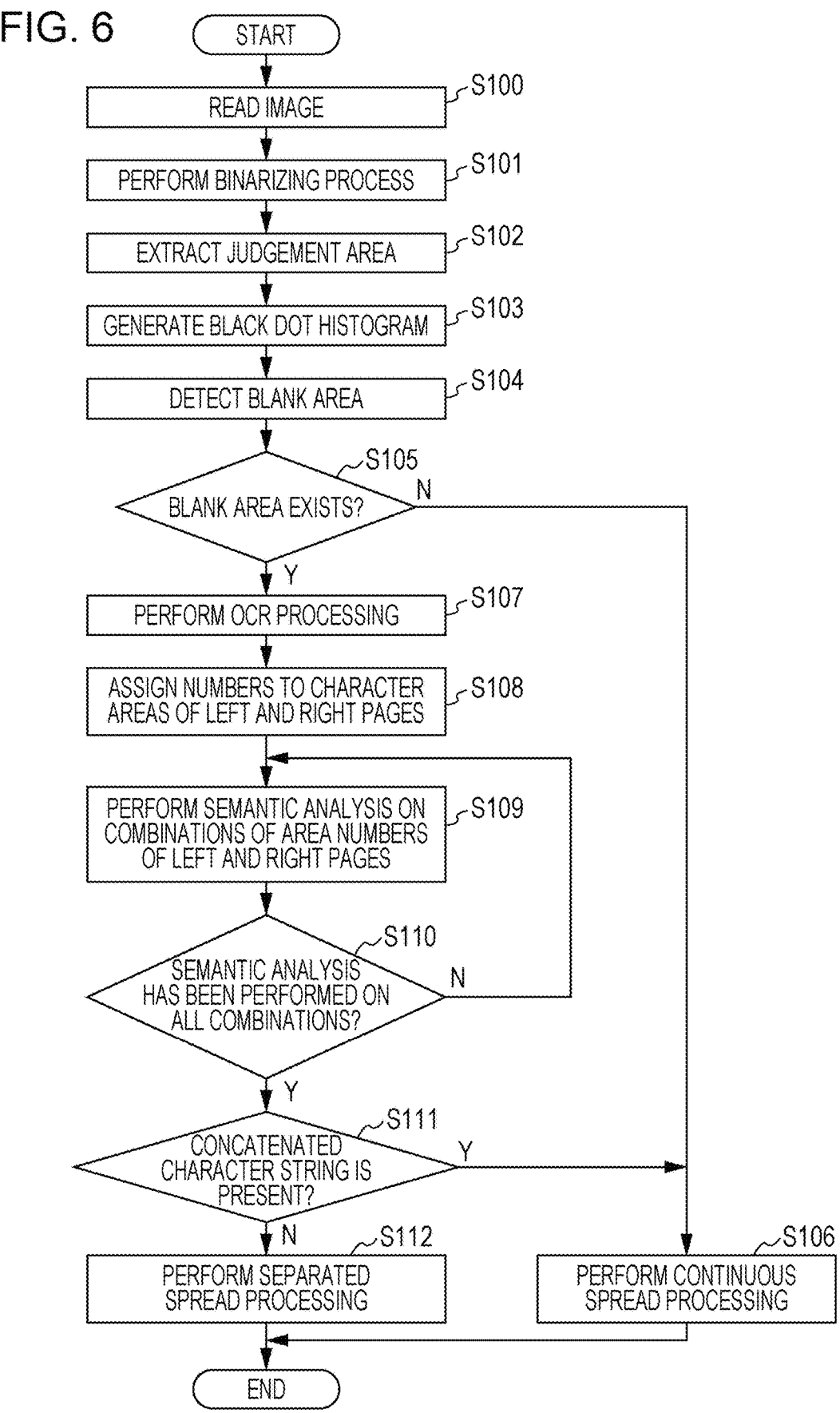
FIG. 6 is a flowchart illustrating a flow of the spread processing according to the exemplary embodiment.

The spread processing according to the present exemplary embodiment that is performed by the image forming apparatus 12 will now be described with reference to FIG. 6. FIG. 6 is a flowchart illustrating the flow of processes of a spread processing program according to the present exemplary embodiment. In the image forming apparatus 12 according to the present exemplary embodiment, the processing illustrated in FIG. 6 is performed in the following manner. A user issues an instruction to start the spread processing via the user interface 22, which is illustrated in FIG. 1, or the like, and in response to the instruction, a CPU (not illustrated) that is included in the image forming apparatus 12 reads the spread processing program stored in memory means such as ROM and runs the program by expanding the program into RAM or the like.

As illustrated in FIG. 6, first, a book or the like is scanned while being in the spread state, and an image thereof is read in step S100. Note that, when the spread processing program is run, the top and the bottom of a spread (a direction in which a spread is to be read) may be specified beforehand via the user interface 22 or the like.

In the next step S101, a binarizing processing is performed. Note that, in the present exemplary embodiment, the case where the entire region of an image of the spread is binarized is described as an example. However, as described above, the binarizing processing may be performed on only the judgement area JA after the judgement area JA has been extracted in the next step S102.

In step S102, the judgement area JA is extracted. Note that, when the spread processing program is run, the width of the judgement area JA that is to be extracted and whose center is set to the boundary between the left and right pages of the spread may be specified beforehand via the user interface 22 or the like. Alternatively, each time the spread processing program is run, the image forming apparatus 12 may specify a range of the width of the judgement area JA in accordance with, for example, the type of a book or the like, or a fixed value of the range may be stored beforehand in the ROM (not illustrated) or the like.

In step S103, black dot histograms of the judgement area JA are generated by using the image data of the spread, which has been binarized and obtained in step S102. Note that, when the spread processing program is run, the intervals at which the black dot histograms are to be generated (the number of lines) in the vertical direction may be specified beforehand via the user interface 22 or the like. Alternatively, each time the spread processing program is run, the image forming apparatus 12 may specify the intervals in accordance with, for example, the type of the book or the like, or a fixed value of the intervals may be stored beforehand in the ROM (not illustrated) or the like.

In step S104, a blank area BA is detected by using the black dot histograms generated in step S103. As described above, the blank area BA is an area that is present in the vicinity of the boundary between left and right pages and in which there is no image from one end to the other thereof in the vertical direction.

In step S105, it is determined whether there is the blank area BA. When the determination is negative, the spread is a continuous spread. Thus, the process continues to step S106, and the continuous spread processing is performed so as to generate image data in which the left and right pages are integrated with each other. In contrast, when the determination in step S105 is positive, the spread is a separated spread, and thus, the process continues to step S107.

In step S107, the OCR processing is performed on the judgement area JA. In the OCR processing, layout analysis is performed on the spread so as to make a sharp distinction between the character areas CA and the image areas GA. The data to be subjected to the OCR processing may be data that has not yet been binarized or may be data that has been binarized.

In step S108, the area numbers, which distinguish the character areas CA, are assigned to the character areas CA in the left and right pages. As the area numbers, for example, serial numbers are assigned to the character areas CA in such a manner that all the combinations of the character areas CA in the left page LP and the character areas CA in the right page RP are made. In this case, when it is assumed that one of the character areas CA in one of the left and right pages clearly does not have a semantic connection with one of the character areas CA in the other page because, for example, there is image data or the like between the character area CA and the boundary between the left and right pages, this character area CA may be excluded from the targets to which the area numbers are assigned. Obviously, the character areas CA are not limited to being assigned with numbers and may be assigned with other identification means (e.g., symbols such as alphabets) that are capable of distinguishing the character areas CA.

In step S109, the semantic analysis is performed on combinations of the area numbers in the left and right pages.

In step S110, it is determined whether the semantic analysis has been performed on each of the combinations of the area numbers in the left and right pages. When the determination is negative, the process returns to step S109, and the semantic analysis is performed on the next combination of the area numbers. In contrast, when the determination in step S110 is positive, the process continues to step S111.

In step S111, as a result of performing the semantic analysis in step S109, it is determined whether there is a combination of the area numbers that includes the concatenated character string CC. When the determination is negative, the spread is determined to be a separated spread. Thus, the process continues to step S112, and the separated spread processing is performed. In the separated spread processing, the left and right pages of the spread is separated from each other, and image data items each of which contains one of the pages are generated. In this case, the division area DA may be extracted. After that, the spread processing program is terminated.

In contrast, when the determination in step S111 is positive, the spread is determined to be a continuous spread. Thus, the process continues to step S106, and the continuous spread processing is performed. Since the contents of the continuous spread processing have been described above, the description thereof will be omitted. After that, the spread processing program is terminated. Note that, in the flow illustrated in FIG. 6, step S101 to step S105 correspond to the above-described blank-region detection processing, and step S107 to step S111 correspond to the layout analysis processing.

Note that, in the above-described exemplary embodiment, although the case has been described as an example in which the binarizing processing and the OCR processing are both performed, the present disclosure is not limited to this case, and one of the binarizing processing and the OCR processing may be performed. For example, only the OCR processing and the semantic analysis may be performed, and it may be determined whether a spread is a continuous spread or a separated spread from the presence or absence of semantical connection between one of the character areas CA in the left page LP and one of the character areas CA in the right page RP. Alternatively, it may be determined whether the spread is a continuous spread or a separated spread by determining, using only the image area extracted as a result of performing the OCR processing, whether a photograph, a table, or the like spreads across the two pages.

In addition, in the above-described exemplary embodiment, although black dot histograms are generated for the entire judgement area JA, the present disclosure is not limited to this exemplary embodiment, and black dot histograms may be limited to being generated for only a character area or an image area.

Furthermore, in the above-described exemplary embodiment, although a case has been described as an example in which the judgement area JA is set to be in the vicinity of the boundary between left and right pages so as to extend from one end to the other of the boundary in a top-bottom direction, the present disclosure is not limited to this exemplary embodiment, and the judgement area JA may extend over a portion of the boundary in the top-bottom direction. For example, given the fact that the upper half of a book or the like often includes an image area and that the lower half of a book or the like often includes a character area, binarization or the OCR processing may be performed on the upper half or the lower half of a spread so as to determine the relevance between the left and right pages of the spread.

In other words, in such a modification described above, part of the flow illustrated in FIG. 6 is omitted.

In the above-described exemplary embodiment, although the image forming apparatus has been described as an example of an information processing apparatus according to the present disclosure, the information processing apparatus according to the present disclosure is not limited to such an image forming apparatus. For example, the spread processing according to the present disclosure may be performed by a terminal such as a personal computer (PC) while using image data of a scanned spread as an input, and the processing result may be stored in a server. Alternatively, the spread processing according to the present disclosure may be performed in the cloud while using image data of a scanned spread as an input, and the processing result may be stored in the cloud.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
receive a series of image information items formed of successive image information items of a plurality of recording media on each of which an image has been formed;
set, as a judgement area, image information of at least a portion of a region having a predetermined width and whose center is set to a boundary between the recording media, which are included in the series of image information items;
perform predetermined image processing on the judgement area and determines whether the image information items of the plurality of recording media are independent of each other in terms of content or are continuous with each other in terms of content; and
output the series of image information items by splitting the series of image information items when the processor determines that the image information items of the plurality of recording media are independent of each other and that outputs the series of image information items together when the processor determines that the image information items of the plurality of recording media are continuous with each other,
wherein the processor performs binarizing processing as the predetermined image processing on the judgement area and determines that the image information items of the plurality of recording media are continuous with each other in terms of content when a blank area that continuously extends from one end to another end of the boundary is not present in the judgement area as a result of the binarizing processing.

2. The information processing apparatus according to claim 1,
wherein the processor generates, by using a result of the binarizing processing, a plurality of black dot histograms each representing a density of pixels in the judgement area in a direction crossing the boundary and determines whether the blank area is present.

3. The information processing apparatus according to claim 2,
wherein the judgement area is an upper half portion or a lower half portion of the region having the predetermined width.

4. The information processing apparatus according to claim 2,
wherein the processor further performs optical character recognition processing as the predetermined image processing on the judgement area when it is determined that there is the blank region as a result of the binarizing processing, and
wherein the processor determines that the image information items of the plurality of recording media are continuous with each other in terms of content when the image information items of the plurality of recording media are semantically continuous with each other and determines that the image information items of the plurality of recording media are independent of each other in terms of content when the image information items of the plurality of recording media are not semantically continuous with each other.

5. The information processing apparatus according to claim 4,
wherein the judgement area is an upper half portion or a lower half portion of the region having the predetermined width.

6. The information processing apparatus according to claim 4,
wherein the processor determines whether the image information items of the plurality of recording media are semantically continuous with each other by performing semantic analysis on a result of the optical character recognition processing.

7. The information processing apparatus according to claim 6,
wherein the judgement area is an upper half portion or a lower half portion of the region having the predetermined width.

8. The information processing apparatus according to claim 6,
wherein the processor divides, by using a result of the optical character recognition processing, character information in the judgement area of each of the plurality of recording media into a plurality of areas each of which is organized in terms of layout and
wherein the processor combines one of the areas in one of the plurality of recording media and one of the areas in another one of the plurality of recording media together so as to form an analysis area and performs the semantic analysis on a character string that is present in the analysis area and that spreads across the boundary.

9. The information processing apparatus according to claim 8,
wherein the judgement area is an upper half portion or a lower half portion of the region having the predetermined width.

10. The information processing apparatus according to claim 1,
wherein the processor further performs optical character recognition processing as the predetermined image processing on the judgement area when it is determined that there is the blank region as a result of the binarizing processing, and
wherein the processor determines that the image information items of the plurality of recording media are continuous with each other in terms of content when the image information items of the plurality of recording media are semantically continuous with each other and determines that the image information items of the plurality of recording media are independent of each other in terms of content when the image information items of the plurality of recording media are not semantically continuous with each other.

11. The information processing apparatus according to claim 10,
wherein the processor determines whether the image information items of the plurality of recording media are semantically continuous with each other by performing semantic analysis on a result of the optical character recognition processing.

12. The information processing apparatus according to claim 11,
wherein the processor divides, by using a result of the optical character recognition processing, character information in the judgement area of each of the plurality of recording media into a plurality of areas each of which is organized in terms of layout and
wherein the processor combines one of the areas in one of the plurality of recording media and one of the areas in another one of the plurality of recording media together so as to form an analysis area and performs the semantic analysis on a character string that is present in the analysis area and that spreads across the boundary.

13. The information processing apparatus according to claim 12, wherein the judgement area is an upper half portion or a lower half portion of the region having the predetermined width.

14. The information processing apparatus according to claim 11, wherein the judgement area is an upper half portion or a lower half portion of the region having the predetermined width.

15. The information processing apparatus according to claim 10, wherein the judgement area is an upper half portion or a lower half portion of the region having the predetermined width.

16. The information processing apparatus according to claim 1, wherein the judgement area is an upper half portion or a lower half portion of the region having the predetermined width.

17. An information processing apparatus comprising:
receiving means for receiving a series of image information items formed of successive image information items of a plurality of recording media on each of which an image has been formed;
setting means for setting, as a judgement area, image information of at least a portion of a region having a predetermined width and whose center is set to a boundary between the recording media, which are included in the series of image information items;
determining means for performing predetermined image processing on the judgement area and determining whether the image information items of the plurality of recording media are independent of each other in terms of content or are continuous with each other in terms of content; and
output means for outputting the series of image information items by splitting the series of image information items when the determining unit determines that the image information items of the plurality of recording media are independent of each other and for outputting the series of image information items together when the determining unit determines that the image information items of the plurality of recording media are continuous with each other,
wherein the determining means performs binarizing processing as the predetermined image processing on the judgement area and determines that the image information items of the plurality of recording media are continuous with each other in terms of content when a blank area that continuously extends from one end to another end of the boundary is not present in the judgement area as a result of the binarizing processing.

* * * * *